United States Patent [19]

Sorce

[11] Patent Number: 5,162,951
[45] Date of Patent: Nov. 10, 1992

[54] METHOD FOR DESIGNING AN OPTICAL SYSTEM
[75] Inventor: Craig J. Sorce, Rochester, N.Y.
[73] Assignee: Eastman Kodak Company, Rochester, N.Y.
[21] Appl. No.: 560,670
[22] Filed: Jul. 31, 1990
[51] Int. Cl.[5] .................................................. G02B 7/18
[52] U.S. Cl. .................................... 359/871; 359/224; 359/846; 359/848; 359/900
[58] Field of Search ............... 350/607, 608, 609, 611, 350/631; 359/846, 847, 848, 871, 872, 900, 196, 198, 212, 224

[56] References Cited

U.S. PATENT DOCUMENTS

| | | | |
|---|---|---|---|
| 3,537,796 | 11/1970 | Dudeney | 356/300 |
| 4,655,563 | 4/1987 | Plante et al. | 350/611 |
| 4,826,303 | 5/1989 | Meier | 359/846 |
| 4,875,764 | 10/1988 | Marino et al. | 359/224 |
| 4,969,726 | 11/1990 | Koning | 350/611 |
| 5,079,641 | 1/1992 | Marino et al. | 359/196 |

FOREIGN PATENT DOCUMENTS 0097311 5/1985 Japan ................................. 350/607

Primary Examiner—Bruce Y. Arnold
Assistant Examiner—R. D. Shafer
Attorney, Agent, or Firm—Stephen C. Kaufman

[57] ABSTRACT

A novel design method suitable for use in an optical system comprising a mirror, a mirror mount, and a flexure that can connect the mirror to the mirror mount. The optical system may undergo a known temperature differential. In turn, each of the components of the optical system may individually dilate or contract in response to the temperature differential. The method accommodates these dilations/contractions, so that they may be accommodated in a known way, thereby avoiding temperature differential induced distortions of the optical system.

10 Claims, 2 Drawing Sheets

METHOD FOR DESIGNING AN OPTICAL SYSTEM

BACKGROUND OF THE INVENTION

1. Field of the Invention

This invention relates to a method suitable for designing an optical system.

2. Introduction to the Invention

I am working on the design of optical systems of the type shown in FIG. 1. Here, an optical system 10 includes a mirror 12, supported from a mirror mount 14, by way of a flexure 16.

It is known that one important design parameter for an optical system like that of FIG. 1, is the coefficient of thermal expansion (CTE), designated by the Greek symbol $\alpha$. The CTE may be expressed by a well-known equation (1):

$$CTE = \alpha = \frac{\Delta L}{L \Delta T} \quad (1)$$

where

L = length of a workpiece having a uniform thermal strain (e.g., the workpiece being the mirror 12, the mirror mount 14, or the flexure 16); and $\Delta L$ = a linear deformation of the workpiece due to a change in temperature of $\Delta T°$.

It is important to know the coefficient of thermal expansion, for example, when the workpiece is part of a statically indeterminate system. Here, expansion or contraction of the workpiece, induced by a change of temperature, may be inhibited or entirely prevented in certain directions. This, in turn, may cause significant distortions in the system, which distortions may have to be investigated by way of the coefficient of thermal expansion, and subsequently accommodated by the system.

For example, with reference to FIG. 1, expansion or contraction of the mirror 12, the mirror mount 14, and/or the flexure 16, induced by a change of temperature $\Delta T$, may cause significant distortions in the mirror 12, and thus vitiate its optical characteristics, for example, that of sharply focusing a radiation beam.

SUMMARY OF THE INVENTION

This last point, that changes in temperature $\Delta T$ may cause significant distortions in the FIG. 1 mirror 12, is now examined with more particularity, and with reference to FIG. 2. FIG. 2 shows an optical system 18 comprising the following three components:

a) a mirror 20 comprising a ULE composition of known CTE ($\alpha_1$), and having an original length $l_1$, and a dilated length $l_1 + \Delta l_1$ induced by a change of temperature $\Delta T$;

b) a mirror mount 22 comprising Invar of known CTE ($\alpha_2$), having an original length $l_2$, and a dilated length $l_2 + \Delta l_2$ induced by the same change of temperature $\Delta T$; and c) a flexure 24 comprising Invar of known CTE ($\alpha_3$), having first and second neckdown portions 26, 28, and shown in first and second displacement positions ($P_1$, $P_2$), before and after a change in temperature $\Delta T$. The flexure 24 connects the mirror 20 to the mirror mount 22, so that in its first position ($P_1$), the mirror 20 and the mirror mount 22 may be perpendicularly aligned on a common axis 30, and so that the mirror 20 is parallel to the mirror mount 22.

The following observations are now made about the FIG. 2 optical system 18 design. First, when the optical system 18 incurs a temperature differential $\Delta T$, the three components (20, 22, 24) may all dilate (or contract), and in different amounts, since they each have their own value of $\alpha$. The magnitude of each of these dilations (contractions) is given by equation (1), i.e., $\Delta L = \alpha L \Delta T$.

Now, the flexure 24, in particular, can respond to this dilation (contraction) action in a twofold way. First, it may tend to move outward from the first position ($P_1$) to the second position ($P_2$). This action, in turn, may displace the mirror 20/mirror mount 22 so that the flexure 24 no longer subtends an original angle $\theta$, as defined by a normal to the mirror 20, but rather an arbitrary rotated angle $\phi$ ($\theta \neq \phi$), in the displaced second position $P_2$. Second, the flexure 24 may begin to twist or bend, especially at the two neckdown sections 26, 28. This twisting or bending may act to introduce an undesired moment ($\overline{M}$) into the mirror 20. The offset of $\phi$ from $\theta$ is a measure of the magnitude of the undesired moment ($\overline{M}$) carried into the mirror 20.

In review, these combined flexure 24 actions may distort the mirror 20 from an original configuration, thus vitiating its optical characteristics.

Workers, heretofore, have been stymied in their attempts to minimize these difficulties.

On the one hand, as indicated by the FIG. 2 flexure 24 neckdown portions 26, 28, they have tried to fashion a "thin" flexure, as compared to say, the solid FIG. 1 flexure 16. It is believed that a thinner flexure can reduce the introduction of the undesirable bending moment ($\overline{M}$) into the mirror 20. However, the benefits of this remedial action may be offset, since a thinner flexure may be more susceptible to coupling lower modes of system 18 vibration, back into the mirror 20. Thus, the lower modes of system 18 vibration are more likely, as compared to an original higher vibration mode with a solid flexure, to produce deleterious mirror 20 vibrations.

Of course, on the other hand, this last problem of vibration coupling, may be reduced by reverting back to a thicker flexure, hence one having a higher axial stiffness, and less susceptible to vibration transmission. However, and in turn, the thicker flexure may lead one back to the original problem of increased, undesirable bending moments $\overline{M}$.

In summary, known design procedures for accommodating FIG. 2 optical system 18 temperature differentials, may be characterized as a trade-off between, on the one hand, desired lower vibration susceptibility, but at the expense of increased bending moment transmission, and on the other hand, desired lower bending moment transmission, but at the expense of enhanced vibration susceptibility.

I have now discovered a novel method for designing an optical system for the types shown in FIGS. 1 and 2. In sharp contrast to extant design procedures, my novel method is not limited to accommodating temperature differentials as trade-offs between two design deficiencies, i.e., increased bending moment transmission, or enhanced vibration susceptibility. Instead, my novel method is optimal, in the sense that one may, for example, have an arbitrarily thick flexure, thus, for example, advantageously dispensing with the need for the neckdown portions. At the same time, the thicker flexure, which has a relatively higher axial stiffness, results in a desired higher first vibration mode of the optical system.

Accordingly, the novel design of the present invention is suitable for use in an optical system that undergoes a known temperature differential $\Delta T$, and wherein the components of the optical system, having an independent CTE, individually dilate or contract in response to the temperature differential $\Delta T$.

The optical system in a first temperature state comprises a) a mirror of length $l_1$ and CTE ($\alpha_1$);

b) a mirror mount of length $l_2$ and CTE ($\alpha_2$); and c) a flexure of length $l_3$ and CTE ($\alpha_3$), which is connected at a first point to the mirror, and at a second point to the mirror mount, so as to separate the mirror and the mirror mount by a distance h.

The optical system in a second temperature state comprises a) the mirror of transformed length $(l_1+\Delta l_1)$;

b) the mirror mount of transformed length $(l_2+\Delta l_2)$; and c) the flexure of transformed length $(l_3+\Delta l_3)$, which separates the mirror and the mirror mount by a transform separation distance $(h+\Delta h)$.

The method of the present invention comprises the steps of (1) constructing a first triangle derived from the optical system in its first temperature state, and comprising
  (i) a first leg defined by the flexure;
  (ii) a second leg defined by a segment of the mirror mount; and
  (iii) a third leg defined by the separation distance between the mirror and the mirror mount;

(2) constructing a second triangle derived from the optical system in its second temperature state, and comprising
  (i) a first leg defined by the flexure of transformed length;
  (ii) a second leg defined by a section of the mirror mount of transformed length; and
  (iii) a third leg defined by the transformed separation distance between the mirror and the mirror mount; and (3) establishing a similarity of the first and second triangles.

BRIEF DESCRIPTION OF THE DRAWING

The invention is illustrated in the accompanying drawing, in which.

DETAILED DESCRIPTION OF THE INVENTION

Figure 1:
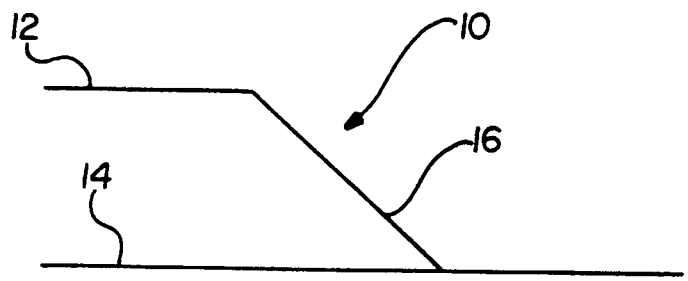
FIG. 1 shows an optical system for which the design method of the present invention is particularly suitable.
Figure 3:
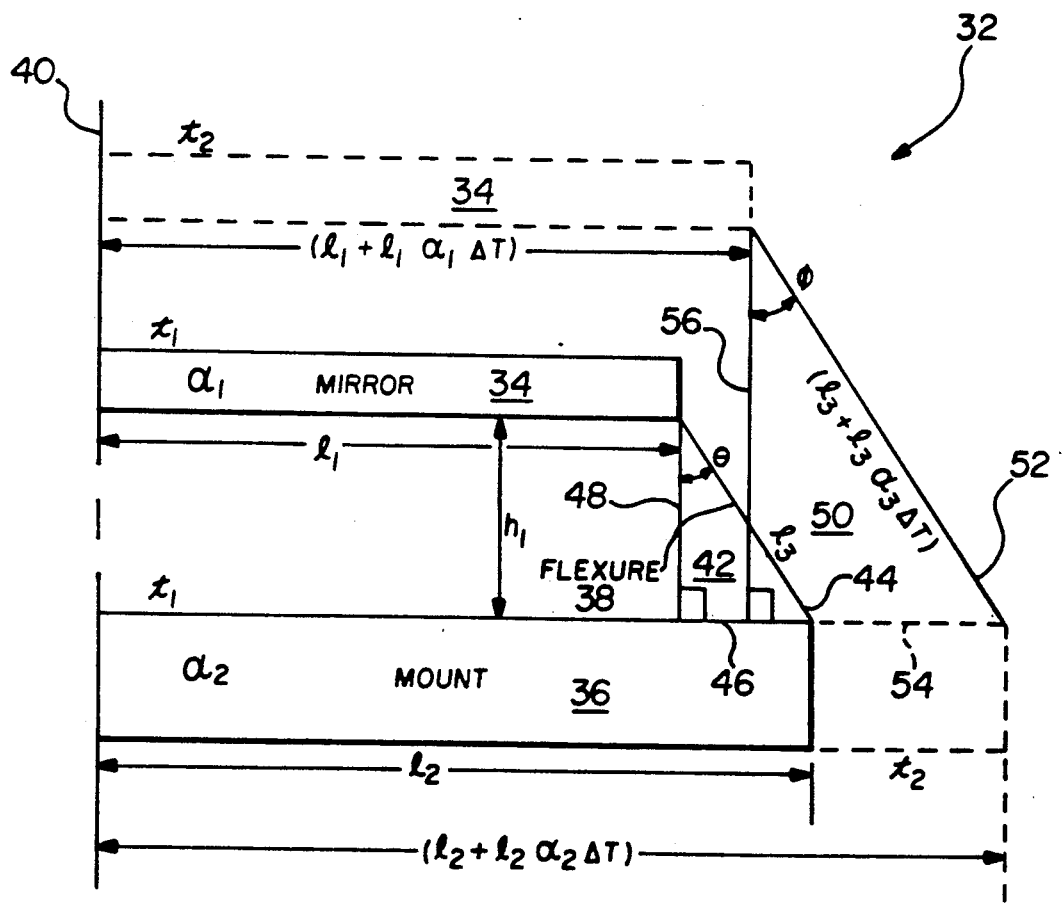
FIG. 3 shows an optical system designed in accordance with a preferred embodiment of the method of the present invention.
Figure 2:
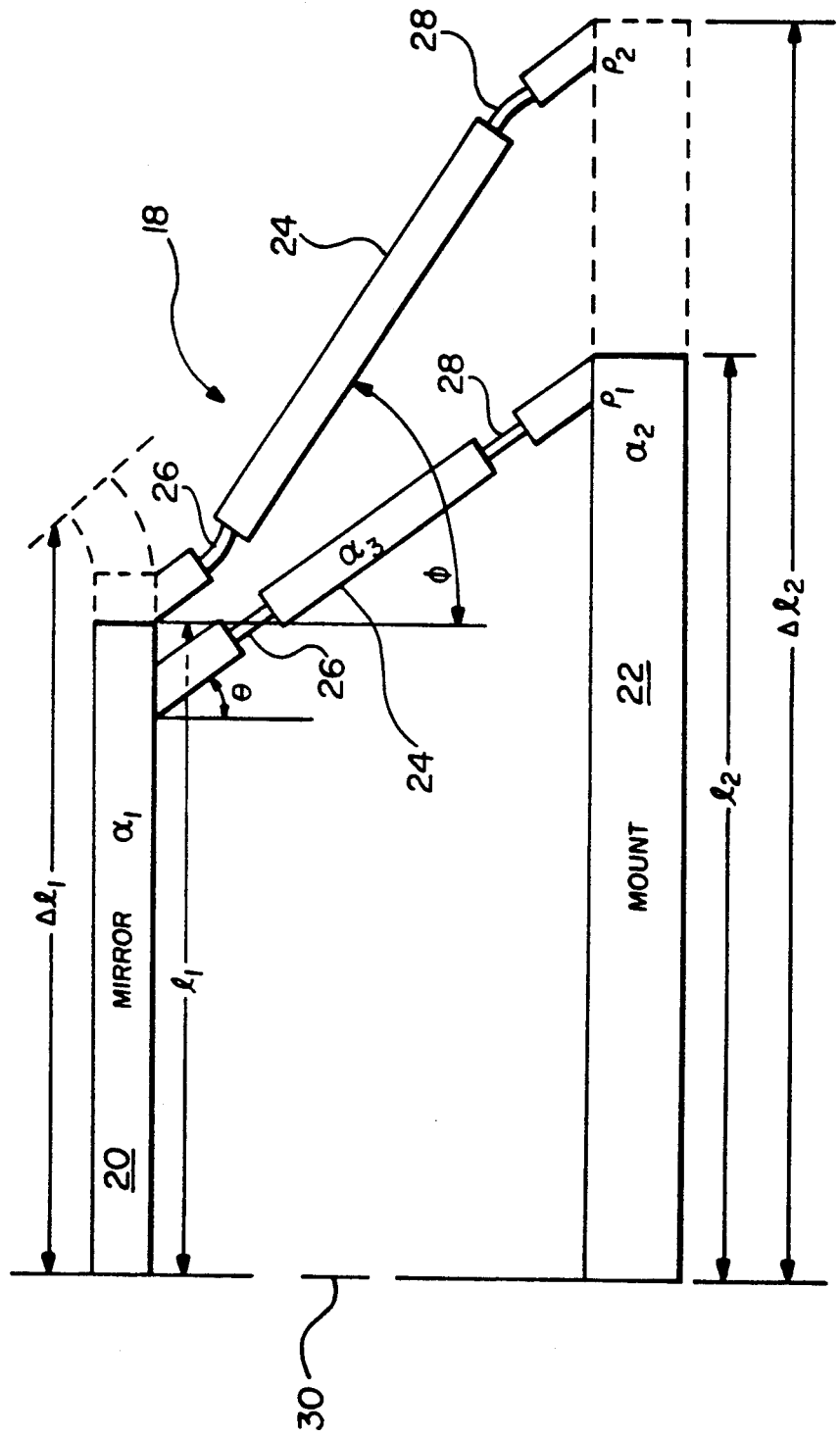
FIG. 2 shows details of the FIG. 1 optical system.

Attention is now directed to FIG. 3, which shows an optical system 32 designed in accordance with a preferred embodiment of the present invention.

The components of the optical system 32 include:

a) a mirror 34 comprising a ULE composition, of known CTE ($\alpha_1$), and having an original length $l_1$ in a first temperature state, $t_1$, and a transformed, dilated length $(l_1+l_1\alpha_1\Delta T)$ in a second temperature state, $t_2$. Note that, in other embodiments, not shown, the mirror 34 may be replaced by other optical devices, including, for example, a lens or a diffraction grating. Also, these other optical devices may comprise other compositions, besides a ULE composition, e.g., Invar, as long as the optical device has a known CTE;

b) a mirror mount 36 comprising Invar of known CTE ($\alpha_2$), and having an original length $l_2$ in the first temperature state, $t_1$, and a transformed dilated length $(l_2+l_2\alpha_2\Delta T)$ in the second temperature state, $t_2$. Note that in other embodiments, not shown, the mirror mount 36 may comprise other suitable materials, like ULE, instead of Invar;

c) a solid flexure 38 comprising Invar, of known CTE ($\alpha_3$), and having an original length $l_3$ in the first temperature state, $t_1$, and a transformed, dilated length $(l_3+l_3\alpha_3\Delta T)$ in the second temperature state, $t_2$. The flexure 38 connects and holds fast, by way of conventional means like screws, the mirror 34 and the mirror mount 36. Further, the flexure 38 separates the mirror 34 and the mirror mount 36 by an original separation distance $h_1$, in the first temperature state, and by a transformed separation distance $(h_1+h_1\alpha_3\Delta T)$ in a second temperature state. The flexure 38 connects the mirror 34 and the mirror mount 36 so that at all times, in both the first and the second temperature states, the mirror 34 and the mirror mount are parallel, and are perpendicular to a common optical axis 40.

As summarized above, the method of the present invention comprises the steps of constructing first and second similar triangles, as derived in one embodiment from the FIG. 3 optical system 32. In the preferred embodiment shown in FIG. 3, the first and second similar triangles are preferably constructed as right triangles. Right triangles are preferred over acute, obtuse, equiangular, equilateral, isosceles or scalene triangles, because they simplify algebraic calculations, set forth below, used to establish their similarity.

The first FIG. 3 right triangle (numeral 42), is derived from the optical system 32 as it is in the first temperature state, $t_1$. The right triangle 42 comprises an hypotenuse 44 defined by the flexure 38; a leg 46 defined by a segment of the mirror mount 36, and having a magnitude $(l_2-l_1)$; and, a leg 48 defined by the separation distance $h_1$ between the mirror 34 and the mirror mount 36. Note that the right triangle 42 comprises an acute angle $\theta$, subtended by the legs 44 and 48.

The second FIG. 3 right triangle (numeral 50) is derived from the optical system 32 as it is in the second temperature state, $t_2$. The right triangle 50 comprises an hypotenuse 52 defined by the flexure 38 in its transformed state; a leg 54 defined by a segment of the transformed mirror mount 36, and having a magnitude $(l_2+\alpha_2 l_2\Delta T-l_1-\alpha_1 l_1\Delta T)$; and, a leg 56 defined by the transformed separation distance $(h_1+h_1\alpha_3\Delta T)$ between the mirror 34 and the mirror mount 36. Note that the right triangle 50 comprises an acute triangle $\phi$, subtended by the legs 52 and 56.

As summarized above, the method of the present invention comprises establishing the similarity of the first and second right triangles (42, 50). In general, similarity of the two right triangles may be established by:

(1) proving that three angles of one triangle are equal respectively to three angles of the other;

(2) proving that two angles of one triangle are equal respectively to two angles of the other;

(3) proving that an acute angle of one equals an acute angle of the other;

(4) proving that an angle of one equals an angle of the other and the including sides are in proportion;

(5) proving that the sides of the two triangles are respectively proportional.

The significance of establishing the similarity of the two triangles (42, 50), by one of these methods, is the following. As a consequence of the similarity of the two triangles (42, 50), the angles $\theta$ and $\phi$, which are substantially unequal in the prior art, ($\theta \neq \phi$) as demonstrated above, are now obliged to be precisely identical, i.e., $\theta \equiv \phi$. This, in turn, means that the flexure 38 now cannot introduce an undesirable bending moment $\overline{M}$ into the mirror 34. This last point follows, it is recalled, because the bending moment $\overline{M}$ carried into the mirror 34 is induced by the angle rotation $\theta \neq \phi$.

Note that once $\theta$ is made to equal $\phi$, the flexure 38 can comprise any arbitrary geometry, without introducing a variable that can induce an undesirable bending moment M back into the mirror 34. In particular, the flexure 38 preferably comprises an arbitrarily thick geometry, thus advantageously reducing the optical system 32 susceptibility to vibration coupling, at the same time as it avoids the introduction of the undesirable bending moment ($\overline{M}$). Thus, it is shown that the prior-art trade-offs of lower vibration susceptibility at the expense of increased bending moment transmission ($\overline{M}$), are entirely bypassed by the method of the present invention.

The desirability and advantages of setting $\theta = \phi$, by way of similar triangles, has just been demonstrated. In the first instance, the tendency for $\phi$ to diverge from $\theta$ results from the temperature differential $\Delta T$, as it manifests itself through the unequal dilations/contractions incurred by each of the individual optical components, the mirror 34, the mirror mount 36, and the flexure 38. As the measure of these dilations/contractions is the CTE parameters ($\alpha_1$, $\alpha_2$, $\alpha_3$), it is precisely these parameters which express the ultimate cause of the tendency for $\phi$ to diverge from $\theta$. Accordingly, these parameters must be accounted for, and accommodated within, the establishing of the similarity of the two triangles (42, 50) by way of $\theta = \phi$.

The consequences of this, algebraically, are as follows.

Thus, in an equation (2), I first set $\theta = \phi$:

$$\theta = \phi \qquad (2)$$

Second, I compute the tan inverse for each side of equation (2), where the magnitudes have been specified above, to define an equation (3):

$$\frac{l_2 - l_1}{h_1} \text{Tan}^{-1} = \frac{(l_2 + l_2\alpha_2\Delta T) - l_1 + l_1\alpha_1\Delta T}{h_1 + h_1\alpha_3\Delta T} \text{Tan}^{-1}. \qquad (3)$$

Note that equation (3) incorporates the three independent CTE's, ($\alpha_1$, $\alpha_2$, $\alpha_3$), as required. Note also that correspondingly equivalent trigonometric relationships, for example, including the cotangent inverse, may be used instead of the tangent inverse relationship.

Equation (3) may be routinely reduced to yield an equation (4):

$$\frac{l_2}{l_1} = \frac{(\alpha_3 - \alpha_1)}{(\alpha_3 - \alpha_2)}. \qquad (4)$$

Equation (4) signifies that the sought-for similarity of triangles 42, 50 may be obtained through the proportionality set forth in this equation.

Restated, I design the original lengths of the mirror 34 and the mirror mount 36, in the ratio $$\frac{(\alpha_3 - \alpha_1)}{(\alpha_3 - \alpha_2)}.$$

Thus, when the optical system 32 incurs the temperature differential $\Delta T$, its components severally and independently dilate (contract) in proportion to their CTE parameters ($\alpha_1$, $\alpha_2$, $\alpha_3$), respectively. However, they must now dilate/contract so as to leave invariant the similarity of the two triangles 42, 50. This last action, as demonstrated above, brings the advantages inter alia:

(1) of eliminating undesirable bending moments carried into the mirror 34, independent of any temperature differentials;

(2) eliminating any design constraints on the flexure 38, thus allowing it to be arbitrarily thick;

(3) thereby lowering the optical system 32 susceptibility to vibration coupling.

What is claimed:

1. An optical system, comprising:
a mirror having a first length $l_1$ at a first temperature $t_1$, a second length $l_1 + \Delta l_1$ at a second temperature $t_2$, and a coefficient of thermal expansion $\alpha_1$ defined by a relationship $\alpha_1 = \Delta l_1 / (l_1 \cdot (t_2 - t_1))$;
a mirror mount having a first length $l_2$ at the first temperature $t_1$, a second length $l_2 + \Delta l_2$ at the second temperature $t_2$, and a coefficient of thermal expansion $\alpha_2$ defined by a relationship $\alpha_2 = \Delta l_2 / (l_2 \cdot (t_2 - t_1))$; and
a flexure having a first length $l_3$ at the first temperature $t_1$, a second length $l_3 + \Delta l_3$ at the second temperature $t_2$, and a coefficient of thermal expansion $\alpha_3$ defined by a relationship $\alpha_3 = \Delta l_3 / (l_3 \cdot (t_2 - t_1))$;
the flexure connecting the mirror to the mirror mount so that, at the first temperature $t_1$, the mirror and mirror mount have a first relative alignment with respect to a common axis, the mirror is separated from the mirror mount by a first distance $h_1$, and the flexure subtends an acute angle $\theta$ relative to a direction normal to the mirror; and so that, at the second temperature $t_2$, the mirror and mirror mount have a second relative alignment with respect to the common axis, the mirror is separated from the mirror mount by a second distance $h_1 + \Delta h_1$, and the flexure subtends an acute angle $\phi$ relative to the direction normal to the mirror; the first lengths $l_1$, $l_2$, $l_3$ and coefficients $\alpha_1$, $\alpha_2$, $\alpha_3$ being relatively defined so that the angle $\theta$ is equal to the angle $\phi$, and the second relative alignment exhibits a geometric similarity to the first relative alignment.

2. An optical system as in claim 1, wherein the length $l_2$ is defined relative to the length $l_1$, by a relationship $l_2 = l_1(\alpha_3 - \alpha_1)/(\alpha_3 - \alpha_2)$.

3. An optical system as in claim 1, wherein the mirror and mirror mount are aligned parallel to each other in spaced relationship and perpendicular to the common axis.

4. An optical system comprising:
a mirror having a first length $l_1$ at a first temperature $t_1$, a coefficient of thermal expansion $\alpha_1$, and a second length defined by a relationship $l_1+l_1\alpha_1(t_2-t_1)$ at a second temperature $t_2$;

a mirror mount having a first length $l_2$ at the first temperature $t_1$, a coefficient of thermal expansion $\alpha_2$, and a second length defined by a relationship $l_2+l_2\alpha_2(t_2-t_1)$ at the second temperature $t_2$; and a flexure having a first length $l_3$ at the first temperature $t_1$, a coefficient of thermal expansion $\alpha_3$, and a second length defined by a relationship $l_3+l_3\alpha_3(t_2-t_1)$ at the second temperature $t_2$;

the ratio of the lengths $l_1$, $l_2$ being defined by a relationship $l_2/l_1=(\alpha_3-\alpha_1)/(\alpha_3-\alpha_2)$; and the flexure connecting the mirror to the mirror mount, so that, at both the first and second temperatures $t_1$, $t_2$, the mirror and mirror mount are in parallel spaced relationship, perpendicular to a common axis, with the flexure subtending a same acute angle relative to a direction normal to the mirror.

5. A method for designing an optical system having a mirror, a mirror mount and a flexure connecting the mirror and the mirror mount in spaced alignment relative to a common optical axis, so that the alignment of the mirror and mirror mount is maintained when the system undergoes a temperature change from a first temperature state $t_1$ to a second temperature state $t_2$;

the optical system in the first temperature state $t_1$ comprising:

a) a mirror of length $l_1$ and coefficient of thermal expansion $\alpha_1$;

b) a mirror mount of length $l_2$ and coefficient of thermal expansion $\alpha_2$; and c) a flexure of length $l_3$ and coefficient of thermal expansion $\alpha_3$; the flexure being connected at a first point to the mirror and at a second point to the mirror mount, so as to separate the mirror and the mirror mount by a distance h, the flexure subtending an acute angle $\theta$ relative to a direction normal to the mirror;

the optical system in the second temperature state $t_2$ comprising:

a) the mirror of transformed length $l_1+\Delta l_1$, where $\Delta l_1=\alpha_1 l_1(t_2-t_1)$;

b) the mirror mount of transformed length $l_2+\Delta l_2$, where $\Delta l_2=\alpha_2 l_2(t_2-t_1)$; and c) the flexure of transformed length $l_3+\Delta l_3$, where $\Delta l_3=\alpha_3 l_3(t_2-t_1)$; the flexure separating the mirror and the mirror mount by a transformed separation distance $h_1+\Delta h_1$, and the flexure subtending an acute angle $\phi$ relative to the direction normal to the mirror; and the method comprising the steps of:

(1) defining a triangle derived from the optical system in its first temperature state $t_1$, the triangle comprising:

(i) a first leg having a length defined by the flexure length $l_1$;

(ii) a second leg joining the first leg and having a length defined by a segment of the length of the mirror mount; and (iii) a third leg joining the first and second legs, and having a length defined by the separation distance $h_1$, between the mirror and the mirror mount, the third leg defining with the first leg an acute angle equal to the angle $\theta$;

(2) defining a deformed triangle derived from the optical system in its second temperature state $t_2$, the deformed triangle comprising:

(i) a first leg having a length defined by the transformed flexure length $l_1+\Delta l_1$;

(ii) a second leg joining the first leg and having a length defined by a segment of the transformed length of the mirror mount; and (iii) a third leg joining the first and second legs, and having a length defined by the transformed distance $h_1+\Delta h_1$ between the mirror and the mirror mount, the third leg defining with the first leg an acute angle equal to the angle $\phi$; and (3) selecting the values of $\alpha_1$, $\alpha_2$ and $\alpha_3$ so that the deformed triangle exhibits a geometric relationship which is geometric similar to the triangle.

6. A method as in claim 5, wherein the respective third and second legs in both the triangle and deformed triangle define right angles.

7. A method as in claim 6, wherein in said selecting step the values of $\alpha_1$, $\alpha_2$ and $\alpha_3$ are chosen by setting the angles $\theta$ and $\phi$ equal to each other.

8. A method as in claim 6, wherein in said selecting step the values of $\alpha_1$, $\alpha_2$ and $\alpha_3$ are chosen by establishing the proportionality of respective sides of the triangle and deformed triangle.

9. A method as in claim 5, for designing an optical system wherein the flexure connects the mirror and mirror mount in spaced parallel relationship in perpendicular alignment relative to the common optical axis, and the selection step further comprises selecting the values of $\alpha_1$, $\alpha_2$, and $\alpha_3$ so that the length $l_2$ is defined relative to the length $l_1$ by a relationship $l_2=l_1(\alpha_3-\alpha_1)/(\alpha_3-\alpha_2)$.

10. A method for designing an optical system having a mirror, a mirror mount and a flexure connecting the mirror and the mirror mount in spaced, parallel relationship, in perpendicular alignment relative to a common optical axis, so that the parallelism and perpendicular alignment of the mirror and mirror mount are maintained over a change in temperature state of the system from a first temperature $t_1$ to a second temperature $t_2$; the method comprising the steps of:

providing a mirror having a length $l_1$ at the first temperature $t_1$, a coefficient of thermal expansion $\alpha_1$, and a length $l_1+\alpha_1 l_1(t_2-t_1)$ at the second temperature $t_2$;

providing a mirror mount having a length $l_2$ at the first temperature $t_1$, a coefficient of thermal expansion $\alpha_2$, and a length $l_2+\alpha_2 l_2(t_2-t_1)$ at the second temperature $t_2$;

providing a flexure having a length $l_3$ at the first temperature $t_1$, a coefficient of thermal expansion $\alpha_3$, and a length $l_3+\alpha_3 l_3(t_2-t_1)$ at the second temperature $t_2$; the flexure subtending an acute angle $\theta$ relative to a direction normal to the mirror at the first temperature $t_1$, and subtending an acute angle $\phi$ relative to the direction normal to the mirror at the second temperature $t_2$; and defining the lengths $l_1$, $l_2$ and the coefficients of thermal expansion $\alpha_1$, $\alpha_2$, $\alpha_3$, in accordance with the ratio $l_2/l_1=(\alpha_3-\alpha_1)/(\alpha_3-\alpha_2)$; and defining the points of connection of the flexure with the mirror and mirror mount so that the angles $\theta$ and $\phi$ are the same.

* * * * *